(12) United States Patent
Li et al.

(10) Patent No.: US 11,144,138 B2
(45) Date of Patent: Oct. 12, 2021

(54) TOUCH PEN, DRIVING METHOD THEREOF AND TOUCH SYSTEM

(71) Applicants: HEFEI BOE OPTOELECTRONICS TECHNOLOGY CO., LTD., Anhui (CN); BOE TECHNOLOGY GROUP CO., LTD., Beijing (CN)

(72) Inventors: Chunhua Li, Beijing (CN); Meng Wang, Beijing (CN); Jie Ling, Beijing (CN); Xiangen Wang, Beijing (CN)

(73) Assignees: HEFEI BOE OPTOELECTRONICS TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 1 day.

(21) Appl. No.: 16/848,312

(22) Filed: Apr. 14, 2020

(65) Prior Publication Data
US 2021/0149504 A1    May 20, 2021

(30) Foreign Application Priority Data
Nov. 19, 2019   (CN) .......................... 201911137565.3

(51) Int. Cl.
*G06F 3/0354* (2013.01)
*G06F 3/044* (2006.01)
*G06F 3/041* (2006.01)

(52) U.S. Cl.
CPC ........ *G06F 3/03545* (2013.01); *G06F 3/0416* (2013.01); *G06F 3/0442* (2019.05); *G06F 2203/04106* (2013.01)

(58) Field of Classification Search
CPC .. G06F 3/03545; G06F 3/0442; G06F 3/0416; G06F 2203/04106; G06F 3/033; G06F 3/0383; G06F 3/04162
See application file for complete search history.

(56) References Cited

U.S. PATENT DOCUMENTS 9,965,060 B1\* 5/2018 Yeh ..................... G06F 3/04162
2020/0192523 A1\* 6/2020 Lee ..................... G06F 3/03545

FOREIGN PATENT DOCUMENTS

CN           108762533 A   * 11/2018

\* cited by examiner

*Primary Examiner* — David D Davis
(74) *Attorney, Agent, or Firm* — Brooks Kushman P.C.

(57) ABSTRACT

A touch pen, a driving method thereof, and a touch system are provided. The touch pen includes: a capacitance circuit having different capacitance values when the touch pen is at different tilt angles; a detection circuit configured to detect a capacitance value of the capacitance circuit and generate capacitance information corresponding to the capacitance value; and a signal generating circuit configured to generate a corresponding driving signal according to the capacitance information.

20 Claims, 4 Drawing Sheets

TOUCH PEN, DRIVING METHOD THEREOF AND TOUCH SYSTEM

CROSS-REFERENCE TO RELATED APPLICATION

This application claims priority to Chinese Patent Application No. 201911137565.3 filed on Nov. 19, 2019, which is incorporated herein by reference in its entirety.

TECHNICAL FIELD

The present disclosure relates to the field of touch control technology, and in particular to a touch pen, a driving method thereof, and a touch system.

BACKGROUND

With the development of touch control technology, more and more electronic devices use a touch method to perform human-computer interaction. A touch pen is a tool often used in human-computer interaction. However, the touch pen in the related technologies may fail to meet user needs.

SUMMARY

In an aspect, some embodiments of the present disclosure provide a touch pen, the touch pen includes:

a capacitor circuit, wherein the capacitor circuit has different capacitance values when the touch pen is at different tilt angles;

a detection circuit, configured to detect a capacitance value of the capacitor circuit and generate capacitance information corresponding to the capacitance value; and a signal generating circuit, configured to generate a corresponding driving signal according to the capacitance information.

In some embodiments, the touch pen further includes a pen body, and the capacitor circuit, the detection circuit, and the signal generating circuit are in the pen body of the touch pen.

In some embodiments, the capacitor circuit includes:

a first electrode, fixed to an inner wall of the pen body;

a second electrode, arranged on a side of the first electrode away from a pen tip of the touch pen, movable along an axial direction of the pen body, and configured to form a first capacitor with the first electrode;

an elastic member, provided between the first electrode and the second electrode; and a fluid, provided on a side of the second electrode away from the pen tip, and used to apply different forces to the second electrode when the touch pen is at different tilt angles to enable the elastic member to have different degrees of deformation.

In some embodiments, the detection circuit includes:

an analog-to-digital conversion circuit, configured to convert a capacitance signal of the first capacitor into a digital signal and output a high level;

a counter, configured to detect the number of times that the analog-to-digital conversion circuit outputs the high level; and a processor, configured to calculate the capacitance value of the first capacitor and output the capacitance information according to the number of times that the analog-to-digital conversion circuit outputs the high level.

In some embodiments, the first electrode is connected to a first ground terminal, and the analog-to-digital conversion circuit includes:

a first switch, connected to the second electrode and a first voltage input terminal, and configured to transmit a signal of the first voltage input terminal to the second electrode in a first period;

a second switch, connected to the second electrode and a first node, and configured to transmit a signal of the second electrode to the first node in a second period;

a second capacitor, arranged between the first node and a second ground terminal;

a comparator, where a first input terminal of the comparator is connected to a second voltage input terminal, and a second input terminal of the comparator is connected to the first node;

a latch, where an input terminal of the latch is connected to an output terminal of the comparator, and an output terminal of the latch is connected to an input terminal of the counter;

a resistor, where a first terminal of the resistor is connected to the first node; and a third switch, connected to a second terminal of the resistor, the second ground terminal, and the output terminal of the latch, and configured to transmit a signal of the second terminal of the resistor to the second ground terminal in response to a signal of the output terminal of the latch.

In some embodiments, the capacitance value has a positive correlation with the tilt angle.

In some embodiments, the elastic member is an insulating structure.

In some embodiments, the fluid includes solid particles.

In some embodiments, the first electrode and the second electrode are conductive plates.

In some embodiments, the elastic member is a spring on which insulation treatment is performed, and two ends of the elastic member are fixed to the first electrode and the second electrode respectively.

In some embodiments, the pen body includes a blocking portion arranged on a side of the second electrode away from the pen tip of the touch pen.

In some embodiments, the touch pen further includes:

a power storage circuit, configured to provide power to the capacitor circuit, the detection circuit, and the signal generating circuit.

In another aspect, some embodiments of the present disclosure provide a touch system, including: the touch pen according to any of the above, and a touch screen that can be used in conjunction with the touch pen.

In some embodiments, the touch screen is configured to display lines with different thicknesses according to changes in a frequency of the driving signal emitted by the touch pen.

In some embodiments, the touch screen is configured to change a brightness of the touch screen according to a change in a frequency of the driving signal emitted by the touch pen.

In another aspect, some embodiments of the present disclosure provide a driving method, which is applied to the touch pen according to any of the above, and the method includes:

detecting a capacitance value of the capacitor circuit when the touch pen is tilted, and generating capacitance information corresponding to the capacitance value; and generating a corresponding driving signal according to the capacitance information.

BRIEF DESCRIPTION OF THE DRAWINGS

In order to illustrate the technical solutions in the embodiments of the present disclosure or the conventional technologies more clearly, the drawings used in the descriptions of the embodiments or the conventional technologies will be briefly introduced hereinafter. Apparently, the drawings in the following descriptions merely illustrate some embodiments of the present disclosure. For those of ordinary skill in the art, other drawings can be obtained based on these drawings without any creative efforts.

DETAILED DESCRIPTION

The technical solutions in the embodiments of the present disclosure will be clearly and completely described hereinafter with reference to the drawings in the embodiments of the present disclosure. Apparently, the described embodiments are only a part of rather than all of the embodiments of the present disclosure. Based on the embodiments in the present disclosure, all other embodiments obtained by a person of ordinary skill in the art without any creative efforts shall fall within the protection scope of the present disclosure.

In order to facilitate a clear description of the technical solutions of the embodiments of the present disclosure, in the embodiments of the present disclosure, words of "first", "second", "third" or the like, are used to differentiate the same or similar items that have substantially the same function and role, and those skilled in the art can understand that the words of "first", "second", "third" or the like do not limit the number and execution order.

An active touch pen is a tool often used in human-computer interaction. In the related technologies, the operating principle of the active touch pen is that: during writing, the screen of the electronic device transmits a certain pressure to the pen core, and a pressure detection device provided inside the pen core receives the pressure and processes it. The processed pressure signal is transmitted to the screen of the electronic device through the conductive part via the pen core, and then is coupled with the capacitance of the screen end, so that the content of writing is presented on the screen of the electronic device.

With the development of touch technology and the increase of people's demand for touch operation, pure pressure-sensitive response is difficult to meet people's experience of applications having high requirements, such as painting.

Some embodiments of the present disclosure provide a touch pen, a driving method thereof, and a touch system to provide a new type of touch pen and improve the writing experience of the touch pen.

Figure 1:
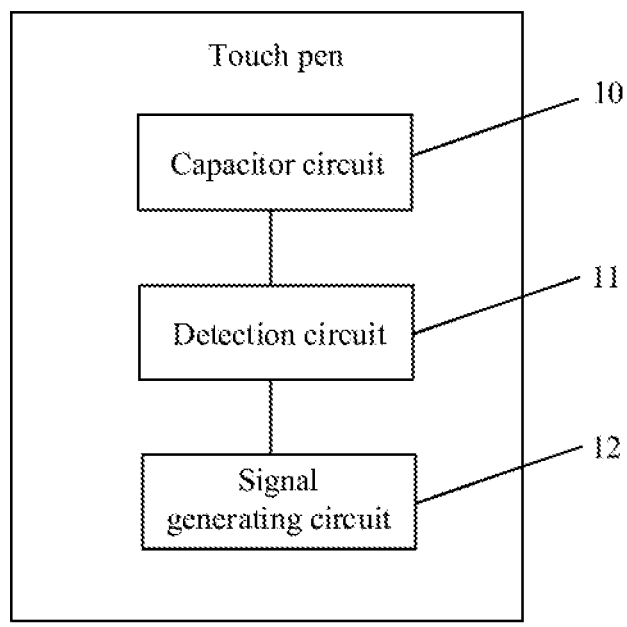
FIG. 1 is a schematic structural diagram of a touch pen provided by some embodiments of the present disclosure.

Some embodiments of the present disclosure provide a touch pen. As shown in FIG. 1, the touch pen includes a capacitor circuit 10, a detection circuit 11, and a signal generating circuit 12.

The capacitor circuit 10 has different capacitance values when the touch pen is at different tilt angles.

Figure 2:
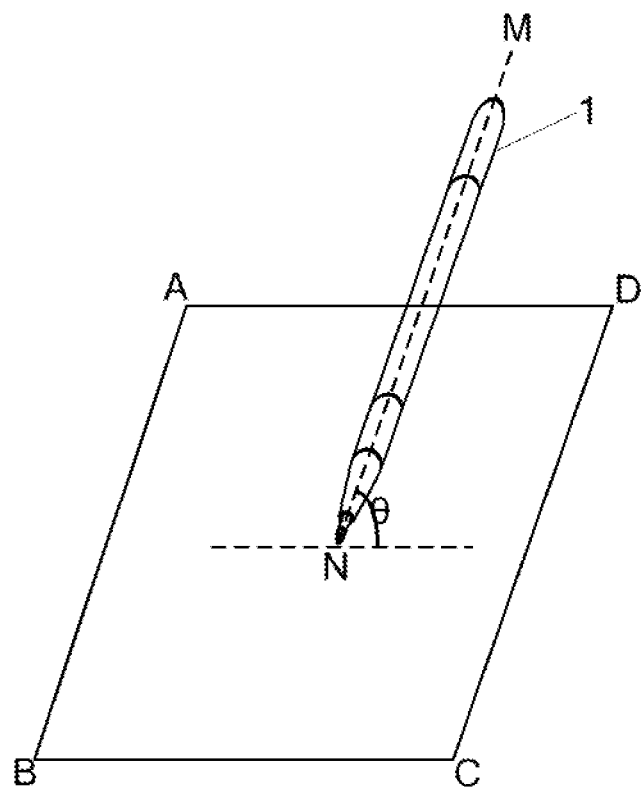
FIG. 2 is a schematic diagram of a tilt angle of a touch pen provided by some embodiments of the present disclosure.

It should be noted that, as shown in FIG. 2, the central axis NM of the touch pen and the plane ABCD (the plane ABCD may be parallel to a horizontal plane, for example) that the touch pen contacts form an angle θ, and the angle θ is the tilt angle of the touch pen. When the gesture of holding the pen is different, the size of the angle θ will change accordingly, and then the touch pen will also be at a different tilt angle. The angle θ ranges from 0° to 90°, inclusively. The specific structure of the capacitor circuit is not limited herein, as long as it has different capacitance values when the touch pen is at different tilt angles.

The detection circuit 11 is connected to the capacitor circuit, and is configured to detect a capacitance value of the capacitor circuit and generate capacitance information. The capacitance information corresponds to the capacitance value. The specific circuit structure of the detection circuit is not limited herein, as long as it has the function of detecting the capacitance value of the capacitance circuit and generating capacitance information.

The signal generating circuit 12 is connected to the detection circuit, and is configured to generate a corresponding driving signal according to the capacitance information. The signal generating circuit may be a circuit unit integrated in a chip such as a single chip microcomputer or an FPGA (Field Programmable Gate Array), and it may also be a separate circuit structure. For example, the signal generating circuit may be a separate signal generator or the like. The embodiments of the present disclosure do not limit the specific circuit structure of the signal generating circuit, as long as it satisfies the corresponding function.

The touch pen may include a pen body 1. In some embodiments of the present disclosure, the capacitor circuit, the detection circuit, and the signal generating circuit are arranged in the pen body of the touch pen. In some embodiments, the pen body 1, the capacitor circuit 10, the detection circuit 11, and the signal generating circuit 12 may be independent components, and the pen body 1 is only used to carry the capacitor circuit 10, the detection circuit 11, and the signal generating circuit 12. In some embodiments, a partial region of the pen body 1 may belong to at least one of the capacitor circuit 10, the detection circuit 11, and the signal generating circuit 12.

The above-mentioned touch pen may further include structures such as an active pen core and a pen case. Only the structures related to the invention point are described herein, and the remaining structures can be obtained by referring to the conventional technologies or common general knowledge, which are not repeated. The above touch pen may be applied to an active touch pen (also referred to as an active pen) and a touch system including the active touch pen.

Embodiments of the present disclosure provide a touch pen. The touch pen includes: a capacitance circuit, the capacitance circuit has different capacitance values when the touch pen is at different tilt angles; a detection circuit connected to the capacitance circuit and configured to detect a capacitance value of the capacitor circuit and generate capacitance information; and a signal generating circuit connected to the detection circuit and configured to generate a corresponding driving signal according to the capacitance information.

The capacitor circuit, the detection circuit, and the signal generating circuit may all be arranged in the pen body of the touch pen. The touch pen may send different driving signals according to the tilt angles of the touch pen to implement different controls on the touch screen, thereby improving the writing experience of the touch pen. The touch pen has the advantages of simple structure, fast response speed, saving cost, reducing power consumption, and easy implementation.

Figure 3:
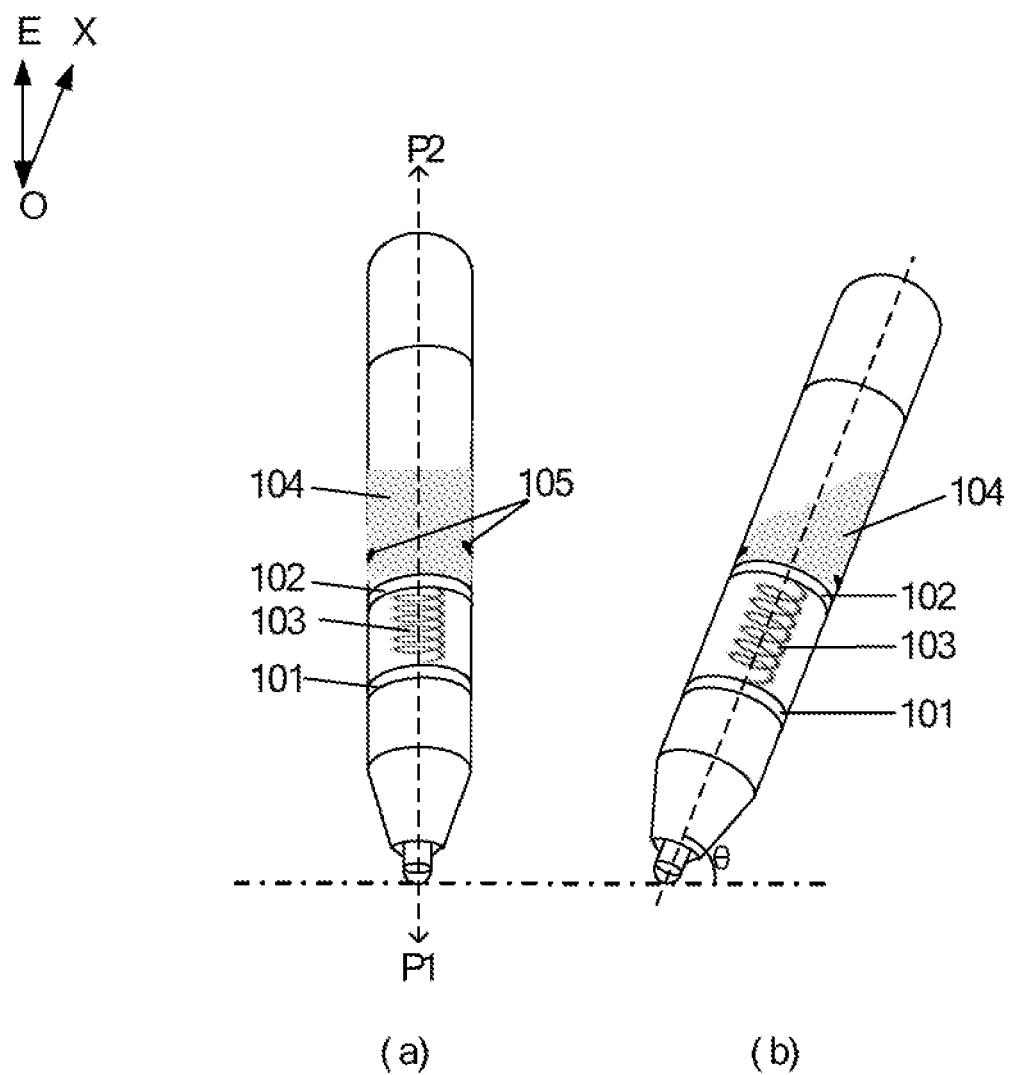
FIG. 3 is a schematic structural diagram of a touch pen at different tilt angles provided by some embodiments of the present disclosure.

In some embodiments, as shown in FIG. 3, the capacitor circuit includes: a first electrode 101, a second electrode 102, an elastic member 103, and a fluid 104.

The first electrode 101 is fixed to an inner wall of the pen body.

The second electrode 102 is arranged on a side of the first electrode 101 away from the pen tip of the touch pen, and is movable along an axial direction P1P2 of the pen body (as shown in FIG. 3(a)). The second electrode 102 is for forming a first capacitor with the first electrode 101.

The elastic member 103 is provided between the first electrode 101 and the second electrode 102. Both ends of the elastic member 103 may be fixed to the first electrode 101 and the second electrode 102, respectively. The elastic member 103 may be an insulating structure. The elastic member may be formed of an insulating medium, or may be an elastic structure covered with an insulating medium, or may be an elastic structure on which insulation treatment is performed.

The fluid 104 is provided on a side of the second electrode 102 away from the pen tip, and is used to apply different forces to the second electrode 102 when the touch pen is at different tilt angles, so that the elastic member 103 is enabled to have different degrees of deformation.

The materials, shapes, and sizes of the first electrode and the second electrode are not specifically limited herein. The sizes and shapes of the first electrode and the second electrode may be determined according to the size and shape of the touch pen. For example, generally, the pen body of a touch pen is cylindrical, and the shapes of the first electrode and the second electrode may be circular plates.

The above fluid may be a solid whose overall shape changes with the tilt angle of the touch pen. For example, the fluid may include a certain number of solid particles, and the material of the solid particles may be plastic, rubber, or the like.

The first electrode and the second electrode may be conductive plates, and the elastic member may be a spring after insulation treatment. In this case, the first capacitor as formed is a plate capacitor. The capacitor circuit has a simple structure, low cost, and is easy to implement.

In the following, a case where the first electrode and the second electrode are both conductive plates and the elastic member is a spring after insulation treatment is taken as an example, and in conjunction with FIGS. 3-5, the principle of the capacitor circuit having different capacitance values when the touch pen is at different tilt angles is described in detail.

Figure 4:
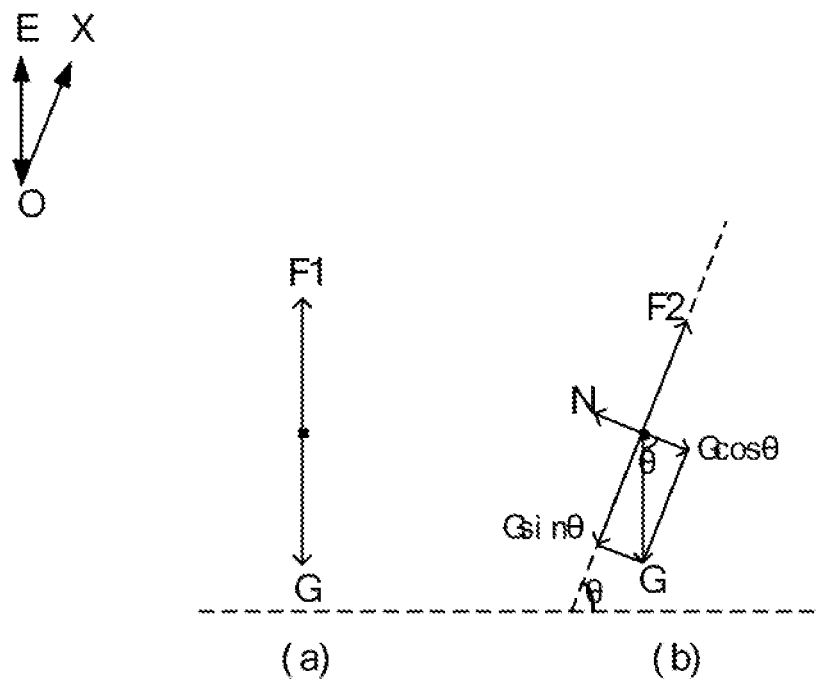
FIG. 4 is a force analysis diagram corresponding to FIG. 3.
Figure 5:
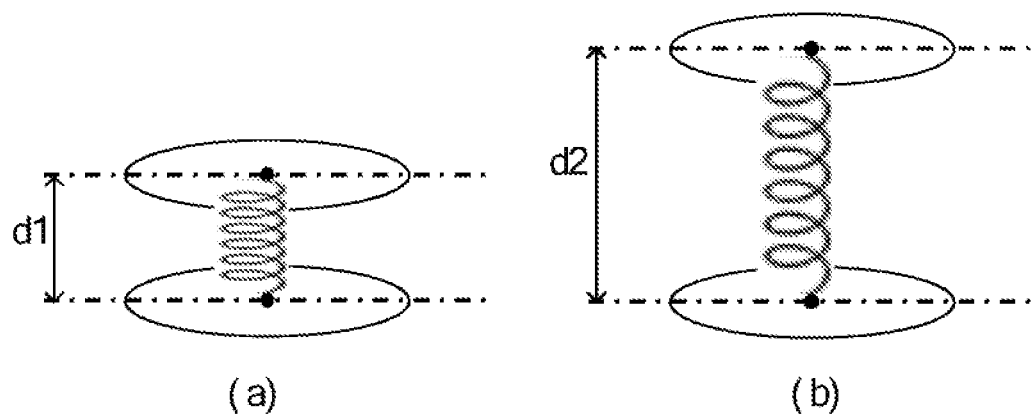
FIG. 5 is a schematic diagram of a length after a spring is deformed corresponding to FIG. 3.

With reference to FIGS. 3-5, when the tilt angle of the touch pen is θ=90°, the analysis of the force on the fluid is shown in FIG. 4(a). In the OE direction, the fluid is subjected to gravity G and the support force F1 of spring against the fluid, where G=F1; in this case, the elastic force of the spring is Fx1=F1=G. According to Hooke's law, Fx1=−k(d−d1), where k is the elastic coefficient of the spring, which is determined by the nature of the material, and has nothing to do with other factors; d is a length of the spring when the spring is not deformed; d1 is as shown in FIG. 5(a), which is a length of the spring after the spring is deformed by a force with magnitude of G; (d−d1) is the degree of deformation of the spring.

When the tilt angle θ of the touch pen is less than 90°, the analysis of the force on the fluid is as shown in FIG. 4(b). In the OE direction, the fluid is subjected to gravity G. In a direction perpendicular to the OX direction, the fluid is subjected to the support force N of the inner wall of the pen body. The support force of the spring in the OX direction is F2. By decomposing G in a direction parallel to the OX direction and in a direction perpendicular to the OX direction, it is obtained that G sin θ=F2; in this case, the elastic force of the spring is Fx2=F2=G sin θ. According to Hooke's law, Fx2=−k(d−d2), where k is the elastic coefficient of the spring, which is determined by the nature of the material, and has nothing to do with other factors; d is the length of the spring when the spring is not deformed; d2 is as shown in FIG. 5(b), which is a length of the spring after the spring is deformed by the force with magnitude of G sin θ; (d−d2) is the degree of deformation of the spring.

Since θ<90°, then sin θ<1, therefore, Fx2<Fx1. Fx1=k(d−d1) and Fx2=k(d−d2), then (d−d2)<(d−d1), and d2>d1 since d is identical.

The calculation formula of the plate capacitor is: C=Q/U=εS/4πKD, where ε is the relative permittivity of the dielectric between the two plates, K is the electrostatic constant, D is the distance between the two plates, and S is the relative area between the two plates.

In the capacitor circuit, D is the length of the spring after the spring is deformed by force.

When the tilt angle of the touch pen is θ=90°, C1=Q/U=εS/4πKd1.

When the tilt angle of the touch pen is θ<90°, C2=Q/U=εS/4πKd2.

Since d2>d1, and ε, S, π, and K are constants, then C2<C1. That is, the capacitance value of the capacitor circuit when the tilt angle θ of the touch pen is 90° is greater than the capacitance value of the capacitor circuit when the tilt angle θ of the touch pen is less than 90°. That is, when the touch pen is at different tilt angles, the capacitance value of the capacitor circuit will change accordingly. The larger the tilt angle is, the larger the capacitance value is (that is, the capacitance value and the tilt angle have a positive correlation).

Figure 6:
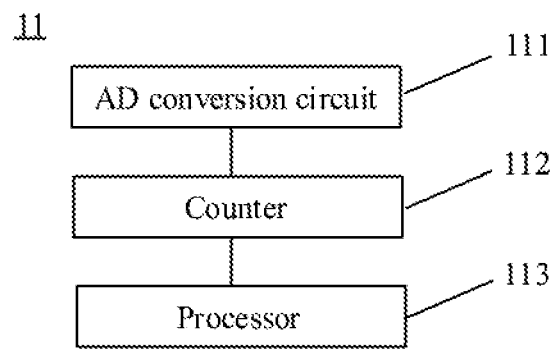
FIG. 6 is a schematic structural diagram of a detection circuit according to some embodiments of the present disclosure.

In some embodiments, in order to limit the moving range of the second electrode, as shown in FIG. 3(a), the pen body of the above-mentioned touch pen may further include: a blocking portion 105 arranged on a side of the second electrode 102 away from the pen tip of the touch pen. For example, the blocking portion may be a protruding portion provided on the inner wall of the pen body, and the protruding portion may be pasted on the inner wall, or may be integrally formed with the pen body. In some embodiments, as shown in FIG. 6, the detection circuit 11 includes:

a analog-to-digital conversion circuit 111, configured to convert a capacitance signal of the first capacitor into a digital signal and output a high level;

a counter 112, connected to the analog-to-digital conversion circuit 111 and configured to detect the number of times that the analog-to-digital conversion circuit outputs the high level; and a processor 113, connected to the counter 112 and configured to calculate the capacitance value of the first capacitor and output the capacitance information according to the number of times that the analog-to-digital conversion circuit outputs the high level.

Figure 7:
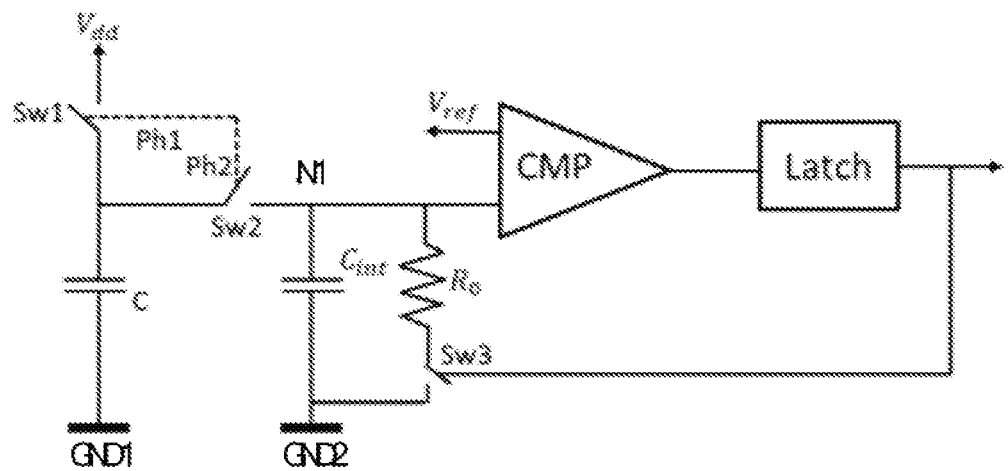
FIG. 7 is a schematic structural diagram of an analog-to-digital conversion circuit provided by some embodiments of the present disclosure.

As shown in FIG. 7, the first electrode of the first capacitor C is connected to the first ground terminal GND1. The above-mentioned analog-to-digital conversion circuit includes:

a first switch Sw1, connected to the second electrode and the first voltage input terminal, and configured to transmit a signal of the first voltage input terminal to the second electrode in a first period;

a second switch Sw2, connected to the second electrode and the first node N1, and configured to transmit the signal of the second electrode to the first node in the second period;

a second capacitor Cint, arranged between the first node N1 and the second ground terminal GND2;

a comparator CMP, where a first input terminal of the comparator is connected to the second voltage input terminal and a second input terminal of the comparator is connected to the first node N1;

a latch Latch, where an input terminal of the latch is connected to an output terminal of the comparator CMP, and an output terminal of the latch is connected to an input of the counter;

a resistor R0, where a first terminal of the resistor is connected to the first node N1;

a third switch Sw3, connected to a second terminal of the resistor R0, the second ground terminal GND2 and the output terminal of the latch Latch, and configured to transmit a signal of the second terminal of the resistor to the second ground terminal in response to a signal of the output terminal of the latch.

The first switch Sw1, the second switch Sw2, and the third switch Sw3 may all be N-type transistors or P-type transistors.

It should be noted that the first node N1 is defined only for the convenience of describing the circuit structure, and the first node N1 is not an actual circuit unit.

For the above circuit, in the first period (Ph1 stage), Sw1 is turned on and Sw2 is turned off; in this case, the power signal (i.e., the signal of the first voltage input terminal) Vdd charges the first capacitor C. When the voltage reaches Vdd, the second period (Ph2 stage) is entered, Sw1 is turned off and Sw2 is turned on; in this case, the first capacitor C charges the second capacitor Cint. The second capacitor Cint is connected to the second input terminal of the comparator CMP through the first node N1, and the first input terminal of the comparator CMP is connected to the reference voltage Vref (i.e., the signal of the second voltage input terminal). Then, when the voltage of the second capacitor Cint reaches Vref, the second capacitor Cint will be discharged to ground; in this case, and the latch Latch will output a high level signal. The above process is repeated until the charge of the second capacitor Cint is completely discharged.

In the above circuit, the charge of the second capacitor Cint during one charging process is Cint*Vref. In one detection cycle, the number of times that the latch Latch output terminal outputs a high level is n. Then, charges that charged to the second capacitor Cint in one detection cycle is Q=n*Cint*Vref=C*Vdd. It can be obtained that, C=n*Cint*Vref/Vdd, where Cint is the capacitance of the second capacitor Cint, C is the capacitance of the first capacitor C, and n is obtained via the counter. The processor may calculate the capacitance value of the first capacitor C according to the above calculation formula of C.

Figure 8:
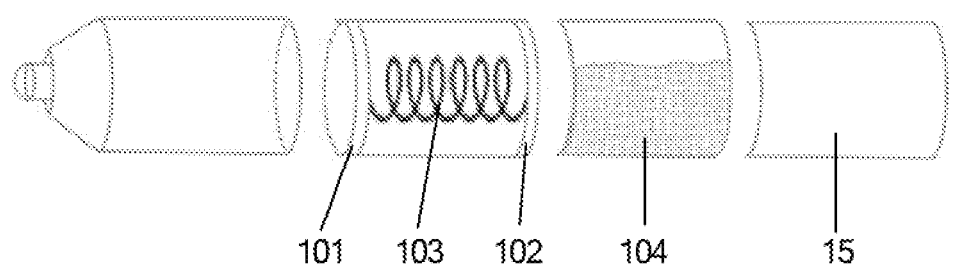
FIG. 8 is a schematic structural diagram of a touch pen provided by some embodiments of the present disclosure.

In some embodiments, the touch pen further includes: a power storage circuit for supplying power to the capacitor circuit, the detection circuit, and the signal generating circuit. The power storage circuit may be a battery 15 shown in FIG. 8, the type of the battery is not limited herein, and it may be a rechargeable battery or a non-rechargeable battery.

Some embodiments of the present disclosure provide a touch system, which includes the touch pen provided in the above embodiments and a touch screen that can be used with the touch pen.

Embodiments of the present disclosure provide a touch system. The touch system includes a touch pen and a touch screen used in conjunction with the touch pen. The touch pen may send different driving signals according to the tilt angles of the touch pen to implement different controls on the touch screen, thereby improving the writing experience of the touch pen and then improving product quality and user experience. The touch system may be a human-computer interaction device, which has the advantages of simple structure, fast response speed, saving cost, reducing power consumption, and easy implementation.

In some embodiments, the touch screen can receive a driving signal from the touch pen and control the touch screen to perform a corresponding operation according to a change in a frequency of the driving signal, such as displaying lines with different thicknesses, thereby meeting application experience having high requirements, such as painting. The driving signal may be an AC signal having a first frequency.

The relationship between the frequency of the driving signal and the capacitance value of the first capacitor may be determined according to actual design requirements. For example, the greater the tilt angle of the touch pen is, the larger the capacitance value of the first capacitor is, and the higher the frequency of the driving signal is; or, the greater the tilt angle of the touch pen is, the greater the capacitance value of the first capacitor is, and the lower the frequency of the driving signal is.

In some embodiments, the higher the frequency of the driving signal received by the touch screen is, the thicker the line displayed by the touch screen is. Or, the higher the frequency of the driving signal received by the touch screen is, the thinner the line displayed by the touch screen is. In some embodiments, the touch screen may receive a driving signal from the touch pen and change a brightness of the touch screen display according to the change in the frequency of the driving signal. For example, the higher the frequency of the driving signal received by the touch screen is, the higher the brightness displayed by the touch screen is; or, the higher the frequency of the driving signal received by the touch screen is, the lower the brightness displayed by the touch screen is.

Some embodiments of the present disclosure provide a method for driving a touch pen. The method may be applied to the touch pen provided in the above embodiments. The method includes the following steps.

S01: detecting a capacitance value of the capacitor circuit when the touch pen is tilted, and generating capacitance information. The capacitance information is corresponding to the capacitance value.

S02: generating a corresponding driving signal according to the capacitance information.

For the content of the touch pen in the method for driving the touch pen, reference can be made to the foregoing embodiments, which is not described herein.

Embodiments of the present disclosure provide a method for driving a touch pen. The touch pen adopting the driving method may send different driving signals according to the tilt angles of the touch pen to implement different controls on the touch screen, thereby improving the writing experience of the touch pen and then improving product quality and user experience.

In the descriptions of the present disclosure, it needs to be understood that orientation or positional relationship indicated by the term of "center", "up", "down", "front", "rear", "left", "right", "vertical", "horizontal", "top", "bottom", "inside", or "outer", etc., is based on the drawings, and is only for the convenience of describing the present disclosure and simplifying the description, and not intended to indicate or imply that the device or element as referred to must have a specific orientation or be constructed and operated in a specific orientation, and therefore cannot be understood as a limitation to the present disclosure.

In the descriptions of the present disclosure, it should be noted that the term of "installation", "connected", or "connecting" should be understood in a broad sense unless explicitly stated and limited. For example, it may be fixed or removable connection, or may be integral connection; it may be direct connection or indirect connection through an intermediate medium, or, it may be internal communication of two elements. For those of ordinary skill in the art, the specific meanings of the above terms in the present disclosure may be understood on a case-by-case basis.

In the descriptions of this specification, specific features, structures, materials, or characteristics may be combined in a suitable manner in any one or more embodiments or examples.

The above descriptions are only specific implementations of the present disclosure, and the protection scope of the present disclosure is not limited thereto. Changes or replacements made by a person skilled in the art within the technical scope disclosed in the present disclosure shall fall within the protection scope of the present disclosure. Therefore, the protection scope of the present disclosure should be determined according to the protection scope of the claims.

What is claimed is:

1. A touch pen, comprising:
   a capacitor circuit, wherein the capacitor circuit has different capacitance values when the touch pen is at different tilt angles;
   a detection circuit, configured to detect a capacitance value of the capacitor circuit and generate capacitance information corresponding to the capacitance value; and
   a signal generating circuit, configured to generate a corresponding driving signal according to the capacitance information;
   wherein the touch pen further comprises a pen body; and wherein the capacitor circuit comprises:
   a first electrode, fixed to an inner wall of the pen body;
   a second electrode, arranged on a side of the first electrode away from a pen tip of the touch pen, movable in an axial direction of the pen body, and configured to form a first capacitor with the first electrode;
   an elastic member, provided between the first electrode and the second electrode; and
   a fluid, provided on a side of the second electrode away from the pen tip, and used to apply different forces to the second electrode when the touch pen is at different tilt angles to enable the elastic member to have different degrees of deformation.

2. The touch pen according to claim 1, wherein the capacitor circuit, the detection circuit, and the signal generating circuit are in the pen body of the touch pen.

3. The touch pen according to claim 1, wherein the detection circuit comprises:

an analog-to-digital conversion circuit, configured to convert a capacitance signal of the first capacitor into a digital signal and output a high level;
   a counter, configured to detect the number of times that the analog-to-digital conversion circuit outputs the high level; and
   a processor, configured to calculate the capacitance value of the first capacitor and output the capacitance information according to the number of times that the analog-to-digital conversion circuit outputs the high level.

4. The touch pen according to claim 3, wherein the first electrode is connected to a first ground terminal, and the analog-to-digital conversion circuit comprises:
   a first switch, connected to the second electrode and a first voltage input terminal, and configured to transmit a signal of the first voltage input terminal to the second electrode in a first period;
   a second switch, connected to the second electrode and a first node, and configured to transmit a signal of the second electrode to the first node in a second period;
   a second capacitor, arranged between the first node and a second ground terminal;
   a comparator, wherein a first input terminal of the comparator is connected to a second voltage input terminal, and a second input terminal of the comparator is connected to the first node;
   a latch, wherein an input terminal of the latch is connected to an output terminal of the comparator, and an output terminal of the latch is connected to an input terminal of the counter;
   a resistor, wherein a first terminal of the resistor is connected to the first node; and
   a third switch, connected to a second terminal of the resistor, the second ground terminal, and the output terminal of the latch, and configured to transmit a signal of the second terminal of the resistor to the second ground terminal in response to a signal of the output terminal of the latch.

5. The touch pen according to claim 1, wherein the capacitance value and the tilt angle have a positive correlation.

6. The touch pen according to claim 1, wherein the elastic member is an insulating structure.

7. The touch pen according to claim 1, wherein the fluid comprises solid particles.

8. The touch pen according to claim 1, wherein the first electrode and the second electrode are conductive plates.

9. The touch pen according to claim 1, wherein the elastic member is a spring on which insulation treatment is performed, and two ends of the elastic member are fixed to the first electrode and the second electrode respectively.

10. The touch pen according to claim 1, wherein the pen body comprises a blocking portion provided on a side of the second electrode away from the pen tip of the touch pen.

11. The touch pen according to claim 1, further comprising: a power storage circuit, configured to supply power to the capacitor circuit, the detection circuit, and the signal generating circuit.

12. A touch system, comprising a touch pen and a touch screen capable of being used with the touch pen;
   wherein the touch pen comprises:
   a capacitor circuit, wherein the capacitor circuit has different capacitance values when the touch pen is at different tilt angles;

a detection circuit, configured to detect a capacitance value of the capacitor circuit and generate capacitance information corresponding to the capacitance value; and a signal generating circuit, configured to generate a corresponding driving signal according to the capacitance information;

wherein the touch pen further comprises a pen body; and wherein the capacitor circuit comprises:

a first electrode, fixed to an inner wall of the pen body;

a second electrode, arranged on a side of the first electrode away from a pen tip of the touch pen, movable in an axial direction of the pen body, and configured to form a first capacitor with the first electrode;

an elastic member, provided between the first electrode and the second electrode; and a fluid, provided on a side of the second electrode away from the pen tip, and used to apply different forces to the second electrode when the touch pen is at different tilt angles to enable the elastic member to have different degrees of deformation.

13. A driving method, applied to the touch pen according to claim 1, comprising:

detecting a capacitance value of the capacitor circuit when the touch pen is tilted, and generating capacitance information corresponding to the capacitance value; and generating a corresponding driving signal according to the capacitance information.

14. The touch system according to claim 12, wherein the touch screen is configured to display lines with different thicknesses according to changes in a frequency of the driving signal emitted by the touch pen.

15. The touch system according to claim 12, wherein the touch screen is configured to change a brightness of the touch screen according to a change in a frequency of the driving signal emitted by the touch pen.

16. The touch system according to claim 12, wherein the capacitor circuit, the detection circuit, and the signal generating circuit are in the pen body of the touch pen.

17. The touch system according to claim 12, wherein the detection circuit comprises:

an analog-to-digital conversion circuit, configured to convert a capacitance signal of the first capacitor into a digital signal and output a high level;

a counter, configured to detect the number of times that the analog-to-digital conversion circuit outputs the high level; and a processor, configured to calculate the capacitance value of the first capacitor and output the capacitance information according to the number of times that the analog-to-digital conversion circuit outputs the high level.

18. The touch system according to claim 17, wherein the first electrode is connected to a first ground terminal, and the analog-to-digital conversion circuit comprises:

a first switch, connected to the second electrode and a first voltage input terminal, and configured to transmit a signal of the first voltage input terminal to the second electrode in a first period;

a second switch, connected to the second electrode and a first node, and configured to transmit a signal of the second electrode to the first node in a second period;

a second capacitor, arranged between the first node and a second ground terminal;

a comparator, wherein a first input terminal of the comparator is connected to a second voltage input terminal, and a second input terminal of the comparator is connected to the first node;

a latch, wherein an input terminal of the latch is connected to an output terminal of the comparator, and an output terminal of the latch is connected to an input terminal of the counter;

a resistor, a first terminal of which is connected to the first node; and a third switch, connected to a second terminal of the resistor, the second ground terminal, and the output terminal of the latch, and configured to transmit a signal of the second terminal of the resistor to the second ground terminal in response to a signal of the output terminal of the latch.

19. The touch system according to claim 12, wherein the capacitance value and the tilt angle have a positive correlation.

20. The touch system according to claim 12, wherein the elastic member is an insulating structure.

* * * * *